United States Patent
Watanabe

(10) Patent No.: US 11,534,847 B2
(45) Date of Patent: Dec. 27, 2022

(54) WIRE ELECTRICAL DISCHARGE MACHINE AND WIRE ELECTRICAL DISCHARGE MACHINING METHOD

(71) Applicant: FANUC CORPORATION, Minamitsuru-gun (JP)

(72) Inventor: Daiki Watanabe, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 237 days.

(21) Appl. No.: 16/878,196

(22) Filed: May 19, 2020

(65) Prior Publication Data
US 2020/0368838 A1    Nov. 26, 2020

(30) Foreign Application Priority Data
May 20, 2019   (JP) .............................. JP2019-094681

(51) Int. Cl.
*B23H 7/20* (2006.01)
*B23H 7/06* (2006.01)

(52) U.S. Cl.
CPC .............. *B23H 7/20* (2013.01); *B23H 7/065* (2013.01); *G05B 2219/45043* (2013.01)

(58) Field of Classification Search
CPC . B32H 7/20; B32H 7/06; B23H 7/065; G05B 2219/45043
See application file for complete search history.

(56) References Cited

U.S. PATENT DOCUMENTS

| | | | | |
|---|---|---|---|---|
| 6,897,397 | B2 * | 5/2005 | Sato | B23H 7/04 |
| | | | | 219/69.12 |
| 7,888,617 | B2 * | 2/2011 | Hiraga | B23H 7/20 |
| | | | | 219/69.12 |

(Continued)

FOREIGN PATENT DOCUMENTS

| | | |
|---|---|---|
| EP | 2 311 594 B1 | 2/2018 |
| JP | H 01-264718 A | 10/1989 |

(Continued)

OTHER PUBLICATIONS

Japanese Office Action dated Oct. 11, 2022, in corresponding Japanese Patent Application No. 2019-094681, with an English translation thereof.

*Primary Examiner* — Geoffrey S Evans
(74) *Attorney, Agent, or Firm* — McGinn I.P. Law Group, PLLC.

(57) ABSTRACT

A wire electrical discharge machine for performing electrical discharge machining on a workpiece by applying voltage to a discharge gap between a wire electrode and the workpiece to generate electrical discharge while causing the wire electrode and the workpiece to move relative to each other, includes: an electrical discharge machining control unit for performing electrical discharge machining by applying voltage to the discharge gap while moving the wire electrode relative to the workpiece according to a machining program and a machining condition; an approach section identifying unit for identifying an approach section in a machining path for the wire electrode with respect to the workpiece, based on the machining program; and an adjustment unit for adjusting the machining condition based on a preset adjustment ratio. In this machine, the electrical discharge machin- (Continued)

ing control unit performs electrical discharge machining control in the approach section, using the adjusted machining condition.

10 Claims, 5 Drawing Sheets

(56) References Cited

U.S. PATENT DOCUMENTS

2004/0178179 A1* 9/2004 Ogata ................ G05B 19/4093
700/162
2017/0060105 A1 3/2017 Onodera et al.

FOREIGN PATENT DOCUMENTS

| | | |
|---|---|---|
| JP | H 04-201120 A | 7/1992 |
| JP | H 05-138443 A | 6/1993 |
| JP | H 05-220626 A | 8/1993 |
| JP | 2688128 B2 | 12/1997 |
| JP | 2003-165030 A | 6/2003 |
| JP | 2006-015478 A | 1/2006 |
| JP | 2006-130657 A | 5/2006 |
| JP | 2007-075996 A | 3/2007 |
| JP | 2011-083866 A | 4/2011 |
| JP | 2017-042882 A | 3/2017 |

* cited by examiner

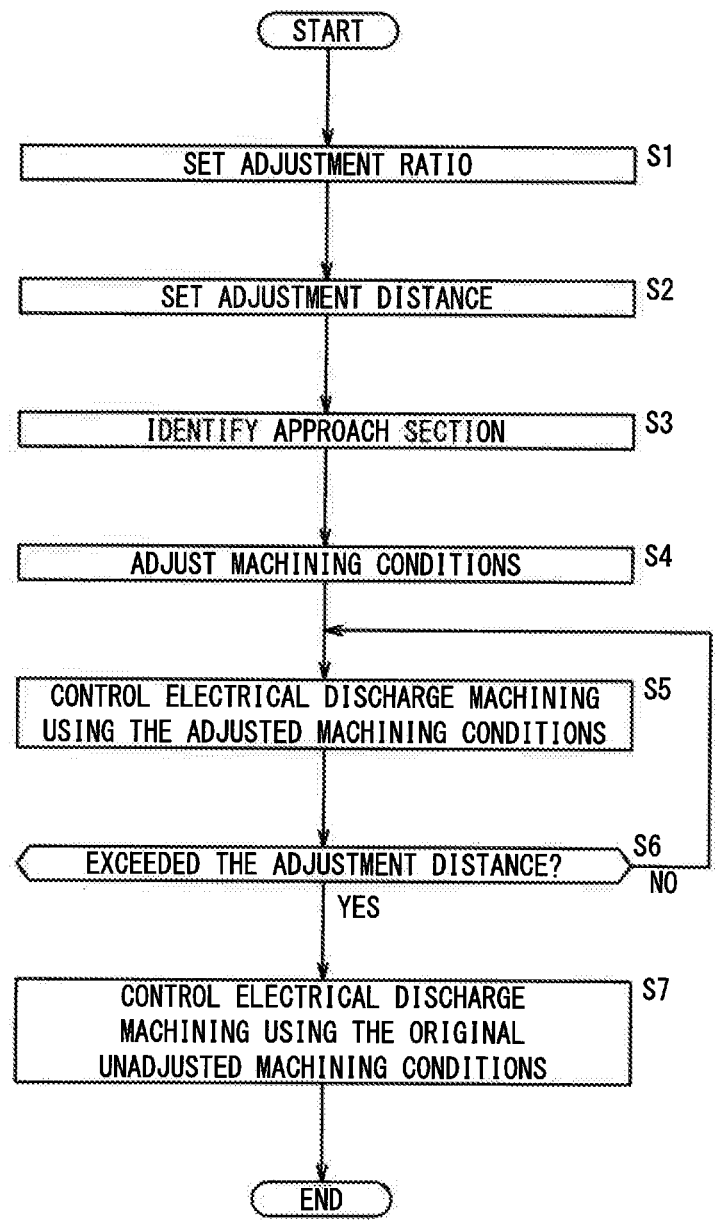

WIRE ELECTRICAL DISCHARGE MACHINE AND WIRE ELECTRICAL DISCHARGE MACHINING METHOD

CROSS-REFERENCE TO RELATED APPLICATION

This application is based upon and claims the benefit of priority from Japanese Patent Application No. 2019-094681 filed on May 20, 2019, the contents of which are incorporated herein by reference.

BACKGROUND OF THE INVENTION

Field of the Invention

The present invention relates to a wire electrical discharge machine and a wire electrical discharge machining method for adjusting machining conditions.

Description of the Related Art

As described in Japanese Patent No. 2688128, conventionally, it has been common practice for an operator to appropriately adjust machining conditions for a wire electrical discharge machine using switches and control knobs.

SUMMARY OF THE INVENTION

In machining at the start of cutting in rough machining of wire electrical discharge machining, breakage of the wire electrode often occurs because generation of electrical discharge takes place intensively when a non-machining state transitions to a machining state. However, when the operator manually adjusts the machining conditions as in Japanese Patent No. 2688128, there is a problem that it takes a lot of time and labor to adjust the machining conditions at the start of cutting.

It is therefore an object of the present invention to provide a wire electrical discharge machine and a wire electrical discharge machining method, which enable automatic adjustment of the machining conditions at the start of cutting.

According to a first aspect of the present invention, a wire electrical discharge machine for performing electrical discharge machining on a workpiece by applying voltage to a discharge gap between a wire electrode and the workpiece to generate electrical discharge while causing the wire electrode and the workpiece to move relative to each other, includes: an electrical discharge machining control unit configured to perform electrical discharge machining by applying voltage to the discharge gap while moving the wire electrode relative to the workpiece according to a machining program and a machining condition; an approach section identifying unit configured to identify an approach section in a machining path for the wire electrode with respect to the workpiece, based on the machining program; and an adjustment unit configured to adjust the machining condition based on a preset adjustment ratio, and the electrical discharge machining control unit is configured to perform electrical discharge machining control in the approach section, using the adjusted machining condition.

According to a second aspect of the present invention, a wire electrical discharge machining method for use in a wire electrical discharge machine for performing electrical discharge machining on a workpiece by applying voltage to a discharge gap between a wire electrode and the workpiece to generate electrical discharge while causing the wire electrode and the workpiece to move relative to each other, includes: an electrical discharge machining control step of performing electrical discharge machining by applying voltage to the discharge gap while moving the wire electrode relative to the workpiece according to a machining program and a machining condition; an approach section identifying step of identifying an approach section in a machining path for the wire electrode with respect to the workpiece, based on the machining program; and an adjustment step of adjusting the machining condition based on a preset adjustment ratio, and the electrical discharge machining control step performs electrical discharge machining control in the approach section, using the adjusted machining condition.

According to the present invention, it is possible to automatically adjust the machining conditions at the start of cutting.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a diagram showing an example of a machining program;

FIG. 5 is a flowchart for explaining a wire electrical discharge machining method according to the embodiment.

DESCRIPTION OF THE PREFERRED EMBODIMENTS

A wire electrical discharge machine and a wire electrical discharge machining method according to the present invention will be described hereinbelow by giving a preferred embodiment with reference to the accompanying drawings.

Embodiment

Figure 1:
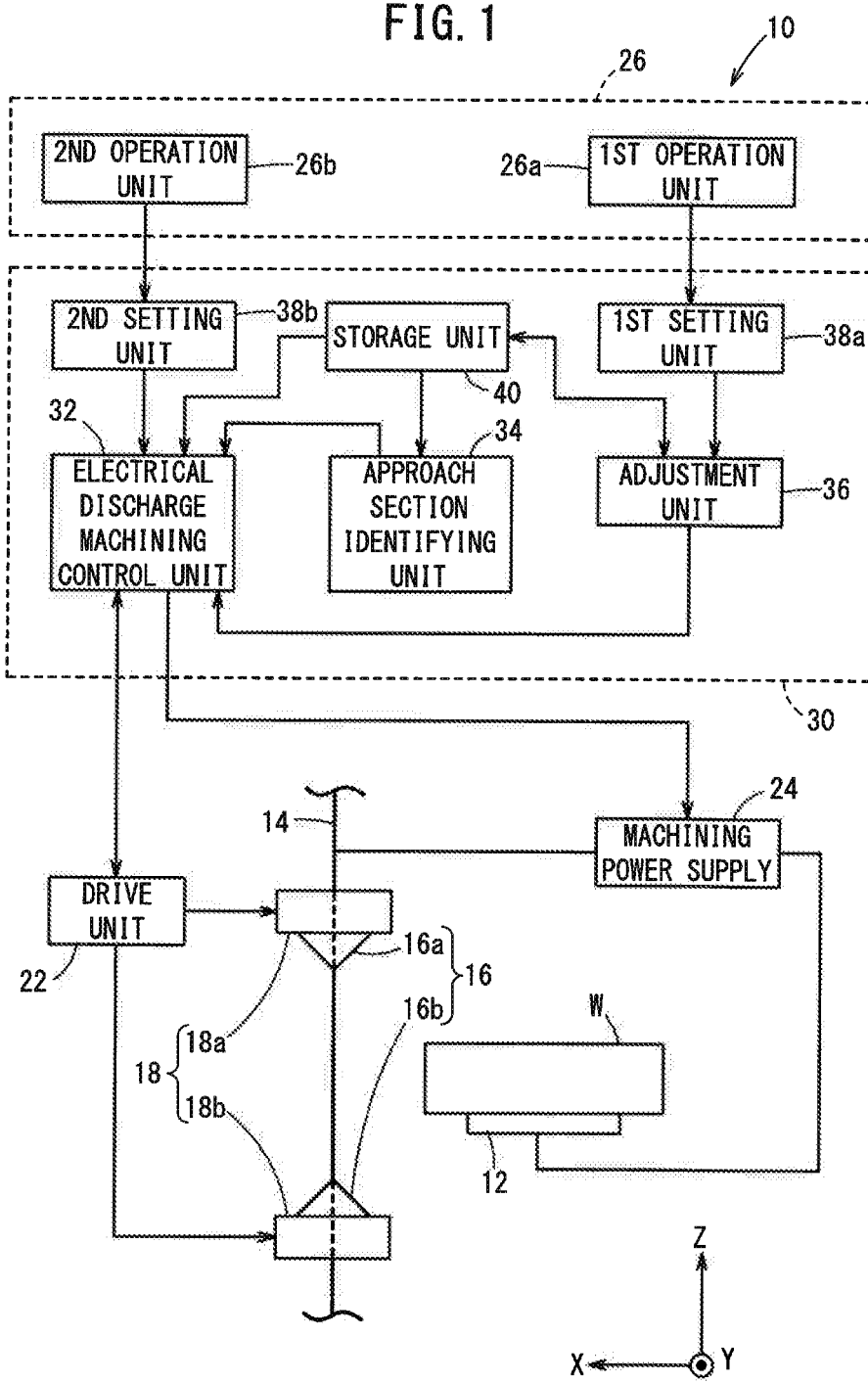
FIG. 1 is a schematic configuration diagram of a wire electrical discharge machine according to an embodiment.

FIG. 1 is a schematic configuration diagram of a wire electrical discharge machine 10 according to the embodiment. The wire electrical discharge machine 10 performs electrical discharge machining on a workpiece W by applying voltage to a gap formed between a wire electrode 14 and the workpiece W to generate electrical discharge while moving the wire electrode 14 relative to the workpiece W mounted on a table 12 along a path specified by a predetermined machining program. The X-axis, Y-axis and Z-axis shown in FIG. 1 are orthogonal to each other, and gravity acts in the negative Z-axis direction.

The wire electrical discharge machine 10 includes the table 12 on which the workpiece W is mounted, an upper wire guide 16a supporting the wire electrode 14 on the upper side (positive Z-axis side) of the workpiece W, a lower wire guide 16b supporting the wire electrode 14 on the lower side (negative Z-axis side) of the workpiece W, an upper guide block 18a in which the upper wire guide 16a is installed and a lower guide block 18b in which the lower wire guide 16b is installed. The upper wire guide 16a and the lower wire guide 16b are hereinafter collectively referred to as upper and lower wire guides 16. The upper guide block 18a and the lower guide block 18b are hereinafter collectively referred to as upper and lower guide blocks 18. The wire electrical discharge machine 10 further includes a drive unit 22, a machining power supply 24, an operation unit 26, and a numerical control device 30.

The drive unit 22 drives the upper and lower guide blocks 18 in order to move the wire electrode 14 and the upper and lower wire guides 16 relative to the workpiece W in the X-axis and Y-axis directions. The drive unit 22 includes motors (not shown), motor encoders (not shown), and drive transmission mechanisms (not shown). The drive transmission mechanisms include ball screws and nuts mounted on the upper and lower guide blocks 18 and other components, to thereby convert the rotational motion of the motors for the X-axis and Y-axis directions into linear motion of the upper and lower guide blocks 18 in the X-axis and Y-axis directions.

Note that the drive unit 22 may be configured to drive the table 12 instead of moving the upper and lower guide blocks 18 as long as the wire electrode 14 can be moved relative to the workpiece W. Alternatively, the drive unit 22 may drive both the upper and lower guide blocks 18 and the table 12.

The machining power supply 24 is connected to the wire electrode 14 and the table 12 to supply voltage to an electrode gap between the wire electrode 14 and the workpiece W.

The operation unit 26 includes a first operation unit 26a through which a ratio specified by the operator is input and a second operation unit 26b through which a distance specified by the operator is input. The first operation unit 26a and the second operation unit 26b may be integrated as a single operation unit. Further, the operation unit 26 may be provided in the numerical control device 30.

The numerical control device 30 includes a processor such as a CPU and a memory, and runs a program stored in the memory to thereby serve as the numerical control device 30 of the present embodiment. The numerical control device 30 includes an electrical discharge machining control unit 32, an approach section identifying unit 34, an adjustment unit 36, a first setting unit 38a, a second setting unit 38b, and a storage unit 40.

The electrical discharge machining control unit 32 controls the drive unit 22 to move the upper and lower guide blocks 18 in accordance with the machining program and machining conditions stored in the storage unit 40, thereby causing the workpiece W and the wire electrode 14 to move relative to each other to control the position of the wire electrode 14 relative to the workpiece W in the X-axis direction and the Y-axis direction. Then, the electrical discharge machining control unit 32 controls the machining power supply 24 according to machining conditions to apply pulse voltage to the discharge gap while moving the wire electrode 14 relative to the workpiece W. Thus, electrical discharge machining is performed.

The approach section identifying unit 34 identifies an approach section of the machining path for the wire electrode 14 with respect to the workpiece W, based on the machining program (numerical control program). The approach section is a section that extends a certain distance from the start of cutting (the machining start point). In order to explain how the approach section identifying unit 34 identifies an approach section, the configuration of a machining program will be described first. FIG. 2 is a diagram showing an example of a machining program.

"S1" in the first line of FIG. 2 is a code for specifying a combination of specific machining conditions such as the machining voltage, the pause time (off time) of voltage application during which no pulse voltage is applied, the relative speed (setup feedrate) of the wire electrode 14 relative to the workpiece W, the amount of dielectric working fluid, the wire tension. The combination of specific machining condition values specified by the S1 is stored in the storage unit 40. "D1" on the first line in FIG. 2 is a code for specifying an offset amount described later. The specific value of the offset amount specified by D1 is, for example, a value such as 0.2 mm, 0.25 mm or the like, and is stored in the storage unit 40.

"G92" on the second line in FIG. 2 is a code for setting a coordinate system, and "X0.0000 Y0.0000" indicates the coordinates of the machining start point. The unit of the coordinates in this machining program is millimeter (mm).

"G91" on the third line of FIG. 2 is a code for specifying a movement amount from the current position (relative movement command). "G01" on the third line in FIG. 2 is a code for a command of linear interpolation. "G41" on the third line in FIG. 2 is a code for an offset command, which is a command for shifting the machining path to the left of the moving direction (machining direction) of the wire electrode 14 from the programmed path after the coordinates "X0.Y–6." by adding an offset amount to the left side of the programmed path.

Figure 3:
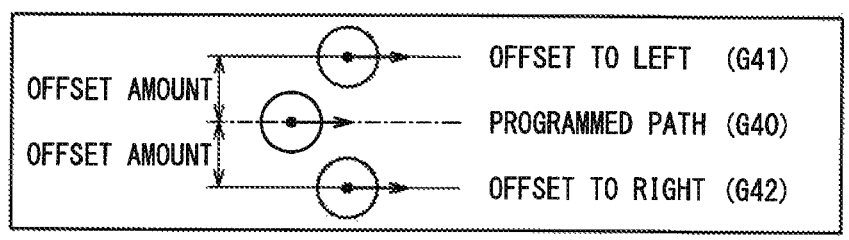
FIG. 3 is a diagram for explaining command content of offset command codes.

FIG. 3 is a diagram for explaining details of the code for the offset command. "G41" is a command code for shifting the machining path to the left of the moving direction of the wire electrode 14 from the programmed path by adding an offset amount to the left side of the programmed path. "G42" is a code for shifting the machining path to the right of the moving direction of the wire electrode 14 from the programmed path by adding an offset amount to the right side of the programmed path. As the offset amounts of "G41" and "G42", the value specified by "D1" on the first line of FIG. 2 is used. "G40" is a code for instructing cancellation of the shifting to return the wire electrode 14 path to the programmed path, that is, "G40" has a function of canceling the offset command of "G41" and "G42".

Accordingly, the path of the wire electrode 14 specified by the commands from "G41" on the third line of FIG. 2 to "G40" on the ninth line in FIG. 2 is a path shifted to the left of the moving direction of the wire electrode 14 from the programmed path by adding the offset amount to the left of the programmed path. That is, the approach section is a section that extends from "X0.0000 Y0.0000" (machining start point) on the second line in FIG. 2 to the approach end point. The approach end point is a point shifted from the point of the coordinate "X0.Y–6." on the third line in FIG. 2 in the Y-axis direction by the offset amount. Therefore, the approach section identifying unit 34 can identify an approach section included in the machining path, based on codes such as "G41" and "G42" in the machining program.

Figure 4:
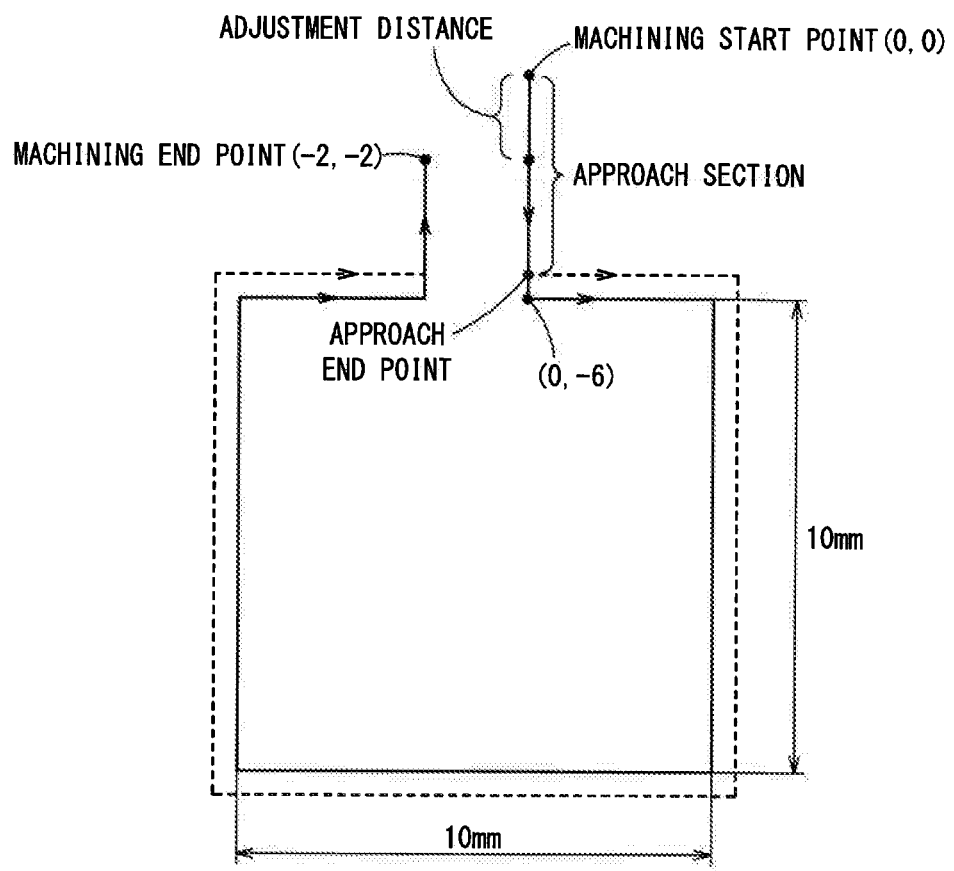
FIG. 4 is a diagram showing a path of the wire electrode based on the machining program in FIG. 2.

FIG. 4 is a diagram showing a path of the wire electrode 14 based on the machining program of FIG. 2. The path programmed in the machining program is indicated by the solid line, and the path with an offset is indicated by the broken line. The wire electrode 14 advances along the path with an offset added, indicated by the broken line, from the approach end point. The approach section identifying unit 34 identifies, as an approach section, the section from the machining start point (0, 0), which is the cutting start point, to the approach end point.

The first setting unit 38a sets a ratio input by the operator through the first operation unit 26a, as the adjustment ratio used by the adjustment unit 36. The adjustment unit 36 adjusts the machining conditions stored in the storage unit 40, based on the adjustment ratio preset by the first setting unit 38a. Herein, the values of the machining conditions are adjusted based on the adjustment ratio (%), on the assumption that the machining conditions stored in the storage unit 40 correspond to 100%. Thus, the operator can adjust the machining conditions based on the ratio input by the operator.

Then, the electrical discharge machining control unit 32 performs electrical discharge machining control in the approach section identified by the approach section identifying unit 34 by using the machining conditions adjusted by the adjustment unit 36 based on the adjustment ratio.

If the adjustment ratio used by the adjustment unit 36 is set at, for example, 80%, the relative speed of the wire electrode 14 relative to the workpiece W is adjusted so as to be 80% of the initial set value. At the same time, the discharge power is also adjusted using a discharge power adjustment ratio that is determined based on the adjustment ratio. The discharge power adjustment ratio may be the same value as the adjustment ratio, or may be greater or smaller than the adjustment ratio.

When it is desired to change the machining conditions while keeping the width of the machined groove unchanged, it is necessary to reduce the relative speed between the wire electrode 14 and the workpiece W together with the discharge power, or to increase both the relative speed and the discharge power. Therefore, in order to prevent breakage of the wire electrode 14, the relative speed should be reduced together with the discharge power. For example, when the adjustment ratio is 80%, the adjustment unit 36 sets the relative speed among the machining conditions to 80% and lowers the discharge power in accordance with a discharge power adjustment ratio corresponding to the adjustment ratio of 80%. The adjustment unit 36 adjusts at least one of the pause time of voltage application and the machining voltage, among the machining conditions, in order to reduce the discharge power. The longer the pause time, the lower the discharge power, and the lower the machining voltage, the lower the discharge power. In any case, since the relative speed of the wire electrode 14 to the workpiece W is reduced while the discharge power is lowered, it is possible to keep the machined groove width at the same width as before the adjustment of the machining conditions while preventing breakage of the wire electrode 14 at the start of cutting. After the wire electrode 14 has passed through the approach section, the electrical discharge machining control unit 32 performs control of electrical discharge machining using the original machining conditions, which are not adjusted based on the adjustment ratio.

In the above description, in the entire approach section, the electrical discharge machining control unit 32 performs electrical discharge machining control based on the adjusted machining conditions. However, a configuration may be adopted so as to perform electrical discharge machining control using machining conditions adjusted based on a preset adjustment ratio in a specified range that extends a preset adjustment distance from the start of cutting in the approach section. Specifically, the second setting unit 38b sets a distance that is input by the operator through the second operation unit 26b, as the adjustment distance to be used by the electrical discharge machining control unit 32. FIG. 4 shows an adjustment distance from the start of cutting in the approach section. The electrical discharge machining control unit 32 performs electrical discharge machining control using the adjusted machining conditions, in a specific range extending from the start of cutting up to the adjustment distance designated by the second setting unit 38b. After the moving distance of the wire electrode 14 from the start of cutting has exceeded the adjustment distance, the electrical discharge machining control unit 32 performs electrical discharge machining control using the original (i.e., unadjusted) machining conditions. By enabling electrical discharge machining control using the adjusted machining conditions in a certain section from the start of cutting to the adjustment distance, the operator can optionally designate a range of machining performed under the adjusted machining conditions, in the approach section, by taking into account the machining shape and other factors.

FIG. 5 is a flowchart for explaining a wire electrical discharge machining method according to the embodiment.

First, the first setting unit 38a sets the ratio input by the operator through the first operation unit 26a, as the adjustment ratio to be used by the adjustment unit 36 (Step S1).

Next, the second setting unit 38b sets the distance input by the operator through the second operation unit 26b, as the adjustment distance to be used by the electrical discharge machining control unit 32 (Step S2).

Then, the approach section identifying unit 34 identifies an approach section in the machining path for the wire electrode 14 with respect to the workpiece W, based on the machining program (Step S3).

Next, the adjustment unit 36 adjusts the machining conditions stored in the storage unit 40, based on the adjustment ratio set at step S1 (step S4).

After step S4, the electrical discharge machining control unit 32 performs electrical discharge machining control in the approach section identified by the approach section identifying unit 34, using the machining conditions adjusted at step S4 (step S5).

After Step S5, the electrical discharge machining control unit 32 determines whether or not the moving distanced of the wire electrode 14 from the start of cutting has exceeded the adjustment distance set at Step S2 (Step S6). If the moving distance has not exceeded the adjustment distance (step S6: NO), the control returns to step S5. If the moving distance has exceeded the adjustment distance (step S6: YES), the control proceeds to step S7.

At step S7, the electrical discharge machining control unit 32 performs electrical discharge machining control using the original (unadjusted) machining conditions.

As described above, according to the wire electrical discharge machine 10, the machining conditions at the start of cutting can be automatically adjusted. That is, the discharge power at the start of cutting can be automatically reduced, so that it is possible to prevent breakage of the wire electrode 14 at the start of cutting. At the same time, automatic reduction of the relative speed of the wire electrode 14 relative to the workpiece W can keep the machined groove width at the same width as before the adjustment of the machining conditions.

Invention Obtained from the Embodiment

The invention that can be grasped from the above embodiment is described below.

First Invention

The wire electrical discharge machine (10) performs electrical discharge machining on a workpiece (W) by applying voltage to a discharge gap between a wire electrode (14) and the workpiece (W) to generate electrical discharge while causing the wire electrode (14) and the workpiece (W) to move relative to each other. The wire electrical discharge machine (10) includes: an electrical discharge machining control unit (32) configured to perform electrical discharge machining by applying voltage to the discharge gap while moving the wire electrode (14) relative to the workpiece (W) according to a machining program and a machining condition; an approach section identifying unit (34) configured to identify an approach section in a machining path for the wire electrode (14) with respect to the workpiece (W), based on the machining program; and an adjustment unit (36) configured to adjust the machining condition based on a preset adjustment ratio. The electrical discharge machining control unit (32) is configured to perform electrical discharge machining control in the approach section, using the adjusted machining condition.

This configuration makes it possible to automatically adjust the machining conditions at the start of cutting and thereby prevent breakage of the wire electrode (14).

The wire electrical discharge machine (10) may further include: a first operation unit (26a) through which a ratio specified by an operator is input; and a first setting unit (28a) configured to set the ratio as the adjustment ratio. This makes it possible to adjust the machining conditions by using a ratio input by the operator.

The electrical discharge machining control unit (32) may be configured to perform electrical discharge machining control from the start of cutting up to a preset adjustment distance, in the approach section, using the adjusted machining condition. This makes it possible to limit the range of machining performed under the adjusted machining conditions in the approach section.

The wire electrical discharge machine (10) may further include: a second operation unit (26b) through which a distance specified by an operator is input; and a second setting unit (28b) configured to set the distance as the adjustment distance. With this configuration, the operator can optionally designate a range within which machining should be performed based on the adjusted machining conditions in the approach section, taking into account the machining shape and other factors.

The machining condition may include the pause time of voltage application and the relative speed of the wire electrode (14) relative to the workpiece (W). This makes it possible to keep the width of the machined groove at the same width as before the adjustment of the machining conditions, while preventing breakage of the wire electrode (14).

Second Invention

A wire electrical discharge machining method is used in a wire electrical discharge machine (10) for performing electrical discharge machining on a workpiece (W) by applying voltage to a discharge gap between a wire electrode (14) and the workpiece (W) to generate electrical discharge while causing the wire electrode (14) and the workpiece (W) to move relative to each other. The wire electrical discharge machining method includes: an electrical discharge machining control step of performing electrical discharge machining by applying voltage to the discharge gap while moving the wire electrode (14) relative to the workpiece (W) according to a machining program and a machining condition; an approach section identifying step of identifying an approach section in a machining path for the wire electrode (14) with respect to the workpiece (W), based on the machining program; and an adjustment step of adjusting the machining condition based on a preset adjustment ratio, and the electrical discharge machining control step performs electrical discharge machining control in the approach section, using the adjusted machining condition.

This method makes it possible to automatically adjust the machining conditions at the start of cutting and thereby prevent breakage of the wire electrode (14).

The wire electrical discharge machine (10) may include a first operation unit (26a) through which a ratio specified by an operator is input. The wire electrical discharging method may further include a first setting step of setting the ratio as the adjustment ratio. This makes it possible to adjust the machining conditions by using a ratio input by the operator.

The electrical discharge machining control step may perform electrical discharge machining control from the start of cutting up to a preset adjustment distance, in the approach section, using the adjusted machining condition. This makes it possible to limit the range of machining performed under the adjusted machining conditions in the approach section.

The wire electrical discharge machine (10) may include a second operation unit (26b) through which a distance specified by an operator is input. The wire electrical discharge machining method may further include a second setting step of setting the distance as the adjustment distance. With this configuration, the operator can optionally designate a range within which machining should be performed based on the adjusted machining conditions in the approach section, taking into account the machining shape and other factors.

The machining condition may include the pause time of voltage application and the relative speed of the wire electrode (14) relative to the workpiece (W). This makes it possible to keep the width of the machined groove at the same width as before the adjustment of the machining conditions, while preventing breakage of the wire electrode (14).

The present invention is not particularly limited to the embodiment described above, and various modifications are possible without departing from the essence and gist of the present invention.

What is claimed is:

1. A wire electrical discharge machine for performing electrical discharge machining on a workpiece by applying voltage to a discharge gap between a wire electrode and the workpiece to generate electrical discharge while causing the wire electrode and the workpiece to move relative to each other, comprising:
   a processor; and
   a memory, the processor running a program stored in the memory to control:
      an electrical discharge machining control unit configured to perform electrical discharge machining by applying voltage to the discharge gap while moving the wire electrode relative to the workpiece according to a machining program and a machining condition;
      an approach section identifying unit configured to identify an approach section in a machining path for the wire electrode with respect to the workpiece, based on the machining program; and
      an adjustment unit configured to adjust the machining condition based on a preset adjustment ratio,
   wherein the electrical discharge machining control unit is configured to perform electrical discharge machining control in the approach section, using the adjusted machining condition.

2. The wire electrical discharge machine according to claim 1, further comprising:
   a first operation unit through which a ratio specified by an operator is input; and
   a first setting unit configured to set the ratio as the adjustment ratio.

3. The wire electrical discharge machine according to claim 1, wherein the electrical discharge machining control unit is configured to perform electrical discharge machining control from start of cutting up to a preset adjustment distance, in the approach section, using the adjusted machining condition.

4. The wire electrical discharge machine according to claim 3, further comprising:
   a second operation unit through which a distance specified by an operator is input; and
   a second setting unit configured to set the distance as the adjustment distance.

5. The wire electrical discharge machine according to claim 1, wherein the machining condition includes a pause time of voltage application and a relative speed of the wire electrode relative to the workpiece.

6. A wire electrical discharge machining method for use in a wire electrical discharge machine for performing electrical discharge machining on a workpiece by applying voltage to a discharge gap between a wire electrode and the workpiece to generate electrical discharge while causing the wire electrode and the workpiece to move relative to each other, comprising:
   an electrical discharge machining control step of performing electrical discharge machining by applying voltage to the discharge gap while moving the wire electrode relative to the workpiece according to a machining program and a machining condition;
   an approach section identifying step of identifying an approach section in a machining path for the wire electrode with respect to the workpiece, based on the machining program; and
   an adjustment step of adjusting the machining condition based on a preset adjustment ratio,
   wherein the electrical discharge machining control step performs electrical discharge machining control in the approach section, using the adjusted machining condition.

7. The wire electrical discharge machining method according to claim 6, wherein the wire electrical discharge machine includes a first operation unit through which a ratio specified by an operator is input,
   the wire electrical discharge machining method further comprising a first setting step of setting the ratio as the adjustment ratio.

8. The wire electrical discharge machining method according to claim 6, wherein the electrical discharge machining control step performs electrical discharge machining control from start of cutting up to a preset adjustment distance, in the approach section, using the adjusted machining condition.

9. The wire electrical discharge machining method according to claim 8, wherein the wire electrical discharge machine includes a second operation unit through which a distance specified by an operator is input,
   the wire electrical discharge machining method further comprising a second setting step of setting the distance as the adjustment distance.

10. The wire electrical discharge machining method according to claim 6, wherein the machining condition includes a pause time of voltage application and a relative speed of the wire electrode relative to the workpiece.

\* \* \* \* \*